United States Patent
Apalkov et al.

(10) Patent No.: US 12,457,906 B2
(45) Date of Patent: Oct. 28, 2025

(54) SPIN-ORBIT TORQUE MAGNETIC RANDOM-ACCESS MEMORY (SOT-MRAM) DEVICE

(71) Applicant: Samsung Electronics Co., Ltd., Suwon-si (KR)

(72) Inventors: Dmytro Apalkov, San Jose, CA (US); Jaewoo Jeong, San Jose, CA (US); Ikhtiar, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 456 days.

(21) Appl. No.: 17/887,042

(22) Filed: Aug. 12, 2022

(65) Prior Publication Data

US 2024/0023458 A1    Jan. 18, 2024

Related U.S. Application Data

(60) Provisional application No. 63/388,846, filed on Jul. 13, 2022.

(51) Int. Cl.
| | |
|---|---|
| *H10N 50/10* | (2023.01) |
| *H10B 61/00* | (2023.01) |
| *H10N 50/01* | (2023.01) |
| *H10N 50/80* | (2023.01) |
| *H10N 50/85* | (2023.01) |

(52) U.S. Cl.
CPC ............ *H10N 50/10* (2023.02); *H10B 61/00* (2023.02); *H10N 50/01* (2023.02); *H10N 50/80* (2023.02); *H10N 50/85* (2023.02)

(58) Field of Classification Search
None
See application file for complete search history.

(56) References Cited

U.S. PATENT DOCUMENTS

| | | | |
|---|---|---|---|
| 8,866,207 B2 | 10/2014 | Hu et al. | |
| 8,912,614 B2 | 12/2014 | Vetrò et al. | |
| 10,205,092 B2 | 2/2019 | Chepulskyy et al. | |
| 11,114,605 B2 | 9/2021 | Ma et al. | |
| 2014/0056060 A1 | 2/2014 | Khvalkovskiy et al. | |
| 2020/0044152 A1 | 2/2020 | Yu et al. | |
| 2020/0365653 A1 | 11/2020 | Tsai et al. | |
| 2020/0388425 A1 | 12/2020 | Jung et al. | |
| 2021/0343936 A1 | 11/2021 | Sun | |
| 2021/0359199 A1 | 11/2021 | Lin et al. | |

OTHER PUBLICATIONS

An, Hongyu et al., "Current-induced magnetization switching using an electrically insulating spin-torque generator," Science Advances, Feb. 23, 2018, vol. 4, No. 2, 9 pages.

Nath, Jayshankar et al., "Mechanism of Spin-Orbit Torques in Platinum Oxide Systems," Advanced Electronic Materials, Mar. 15, 2022, vol. 8, No. 7, 6 pages.

EPO Extended European Search Report dated Dec. 6, 2023, issued in corresponding European Patent Application No. 23180907.0, 13 pages.

*Primary Examiner* — Anthony Ho
(74) *Attorney, Agent, or Firm* — Lewis Roca Rothgerber Christie LLP

(57) ABSTRACT

A spin-orbit torque magnetic random-access memory (SOT-MRAM) device includes a substrate, a spin orbit torque line above the substrate, a composite-metal-oxide seed layer above the spin orbit torque line, and a magnetic tunnel junction above the composite-metal-oxide seed layer. The magnetic tunnel junction includes a free layer above the composite-metal-oxide seed layer, a main tunneling barrier layer above the free layer, and a pinned layer above the main tunneling barrier layer.

18 Claims, 2 Drawing Sheets

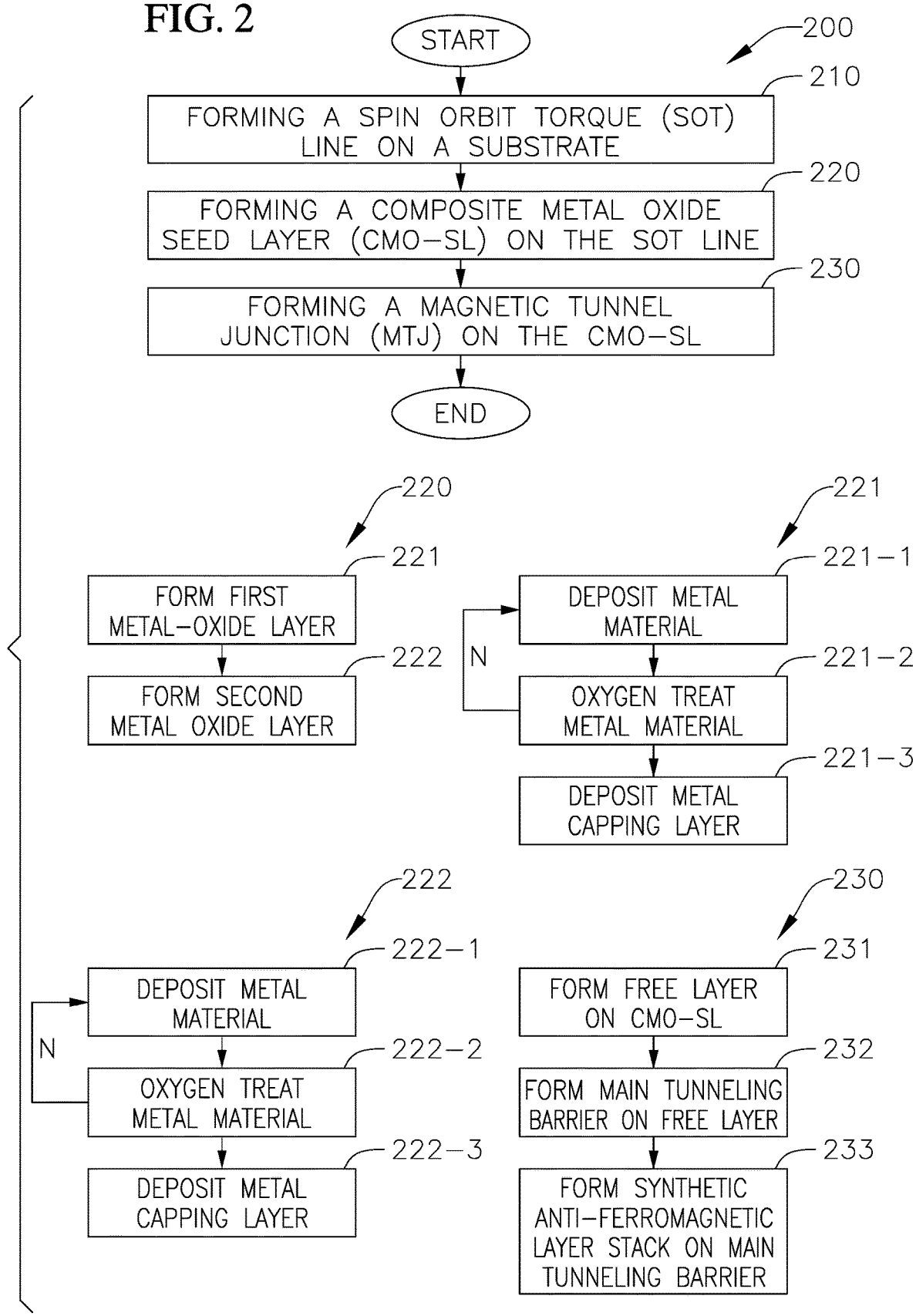

SPIN-ORBIT TORQUE MAGNETIC RANDOM-ACCESS MEMORY (SOT-MRAM) DEVICE

CROSS-REFERENCE TO RELATED APPLICATION(S)

This application claims priority to and the benefit of U.S. Provisional Application No. 63/388,846, filed Jul. 13, 2022, the entire content of which is incorporated herein by reference.

BACKGROUND

1. Field

The present disclosure relates to spin-orbit torque magnetic random-access memory (SOT-MRAM) devices and methods of manufacturing the same.

2. Description of the Related Art

Magnetic random-access memory (MRAM) devices store information utilizing magnetic materials as an information recording medium. One type of MRAM is a spin-transfer-torque magnetic random-access memory (STT-MRAM). STT-MRAM devices include a magnetic tunnel junction (MTJ) having a tunnel barrier layer stacked between a magnetic free layer and a magnetic pinned (or fixed) layer. To write to a STT-MRAM device, current is driven through the MTJ, which causes the magnetic moment of the free layer to be either aligned or anti-aligned with the magnetic moment of the pinned layer, which is unaffected by the current. To read from the STT-MRAM, a read current passes through the MTJ. However, the shared read/write path in an STT-MRAM device can impair its read reliability because the write current can impose stress on the tunnel barrier layer of the MTJ.

Another type of MRAM is spin-orbit torque magnetic random-access memory (SOT-MRAM). To write to the SOT-MRAM, the magnetization of the free magnetic layer is switched by supplying an in-plane current to a spin orbit torque (SOT) layer below the MTJ. To read from the SOT-MRAM, a read current passes through the MTJ. Accordingly, the read/write paths in a SOT-MRAM device are separate, which can improve performance.

SUMMARY

The present disclosure relates to various embodiments of a spin-orbit torque magnetic random-access memory (SOT-MRAM) device. In one embodiment, the SOT-MRAM device includes a substrate, a spin orbit torque line above the substrate, a composite metal oxide seed layer above the spin orbit torque line, and a magnetic tunnel junction above the composite-metal-oxide seed layer. The magnetic tunnel junction includes a free layer on the composite metal-oxide seed layer, a main tunneling barrier layer above the free layer, and a pinned layer above the main tunneling barrier layer.

The spin orbit torque line may include tantalum, tungsten, platinum, hafnium, or combinations thereof.

The spin orbit torque line may include an alloy of two or more materials selected from tungsten, platinum, terbium, bismuth, hafnium, zirconium, silver, gold, silicon, copper, chromium, vanadium, and molybdenum.

The spin orbit torque line may include a first layer and a second layer above the first layer. The first layer and the second layer may include different materials selected from tungsten, platinum, terbium, bismuth, hafnium, zirconium, silver, gold, silicon, copper, chromium, vanadium, and molybdenum.

The spin orbit torque line may include oxidation at an interface between the first layer and the second layer.

The spin orbit torque line may include a number of layers, and each layer may be the same oxide of tungsten, platinum, terbium, bismuth, hafnium, zirconium, silver, gold, silicon, copper, chromium, vanadium, or molybdenum.

The spin orbit torque line may be a topological insulator such as bismuth telluride (BiTe), bismuth selenide (BiSe), TlBiTe, TlBiSe, SbTeS, BiTeS, BiTeSe, GeSbTe, SnSbTe, GeBiTe, SnBiTe, BiSb, or BiSbSe.

The spin orbit torque line may include iridium oxide ($IrO_2$) or $SrIrO_3$.

The spin orbit torque line may include a heavy metal based anti-ferromagnet or ferrimagnet.

The heavy metal based anti-ferromagnet or ferrimagnet may be $A_xB_{1-x}$, where A is iridium (Ir), platinum (Pt), palladium (Pd), or rhodium (Rh), where B is (Mn) or iron (Fe), and where x is a value between 0 and 1.

The composite-metal-oxide seed layer may include a first metal oxide layer and a second metal oxide layer.

The first metal oxide layer may include zirconium (Zr), niobium (Nb), tantalum (Ta), hafnium (Hf), magnesium (Mg), magnesium aluminide (MgAl), or aluminum (Al).

The second metal oxide layer may include nickel (Ni), iron (Fe), cobalt (Co), manganese (Mn), chromium (Cr), or vanadium (V).

The first metal oxide layer and/or the second metal oxide layer may include a number of metal oxidation layers.

The number may be in a range from 2 to 10.

The first metal layer and the second metal layer may each have a thickness in a range from approximately 1 Å to approximately 10 Å.

The first metal oxide layer may be above the second metal oxide layer.

The second metal oxide layer may be above the first metal oxide layer.

The pinned layer may be a synthetic antiferromagnetic pinned layer including a polarization enhancing layer (PEL) including a texture breaking layer (TBL), a bottom pinned layer above the PEL, a spacer layer above the bottom pinned layer, and a top pinned layer above the spacer layer.

The present disclosure also relates to various embodiments of manufacturing a spin-orbit torque magnetic random-access memory (SOT-MRAM) device. In one embodiment, the method includes forming a spin orbit torque line above a substrate, forming a composite metal oxide seed layer above the spin orbit torque layer, and forming a magnetic tunnel junction above the composite-metal-oxide seed layer. Forming the composite metal oxide seed layer may include depositing a first metal layer, performing an oxygen treatment of the first metal layer, depositing a second metal layer, and performing an oxygen treatment of the second metal layer.

The first metal may be zirconium (Zr), niobium (Nb), tantalum (Ta), hafnium (Hf), magnesium (Mg), magnesium aluminide (MgAl), or aluminum (Al).

The second metal may be nickel (Ni), iron (Fe), cobalt (Co), manganese (Mn), chromium (Cr), or vanadium (V).

Forming the composite metal oxide seed layer may include repeatedly depositing the first metal layer and repeatedly performing the oxygen treatment of the first metal layer.

Forming the composite metal oxide seed layer may include repeatedly depositing the second metal layer and repeatedly performing the oxygen treatment of the second metal layer.

The first metal layer and the second metal layer may each have a thickness in a range from approximately 1 Å to approximately 10 Å.

Depositing the first metal layer may include depositing the first metal layer above the second metal layer.

Depositing the second metal layer may include depositing the second metal layer above the first metal layer.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 2 is a flowchart illustrating tasks of a method of manufacturing the embodiment of the SOT-MRAM device of FIG. 1.

DETAILED DESCRIPTION

Figure 1:
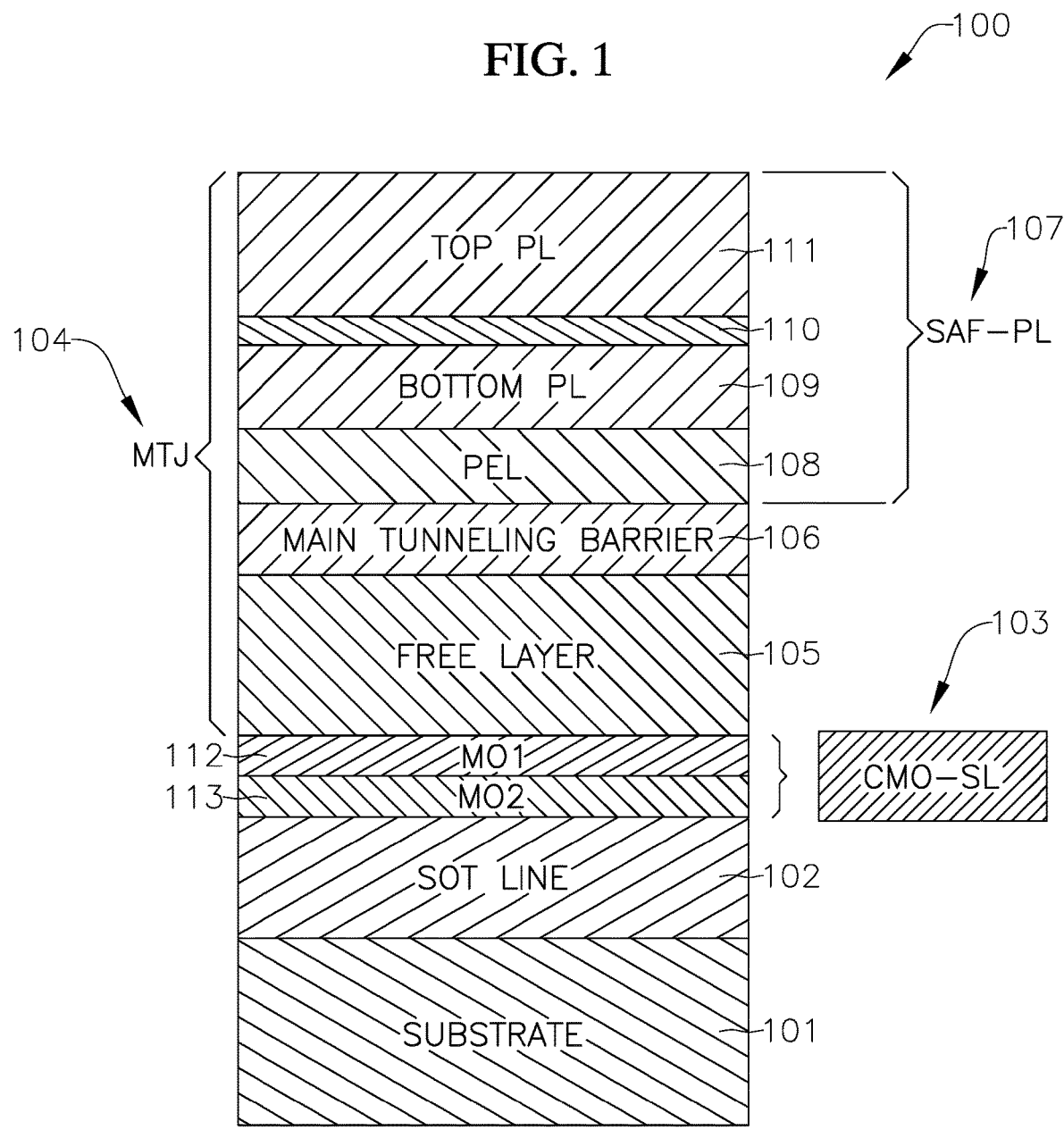
FIG. 1 is a cross-sectional view of a spin-orbit torque magnetic random-access memory (SOT-MRAM) device according to one embodiment of the present disclosure.

The present disclosure relates to various embodiments of a spin-orbit torque magnetic random-access memory (SOT-MRAM) device and methods of manufacturing SOT-MRAM devices. The SOT-MRAM device includes a magnetic tunnel junction (MTJ) having a magnetic free layer and a magnetic pinned (fixed) layer. In one or more embodiments, the SOT-MRAM device also includes both a spin orbit torque (SOT) line and a composite metal oxide seed layer (CMO-SL) below the MTJ. The SOT line is configured to generate a transverse spin-current that generates a spin orbit torque (SOT) that switches a magnetization direction of the free layer. The CMO-SL is configured to provide transparency to the transverse spin-current generated by the SOT line such that the spin-current is transmitted efficiently to the free layer with minimal loss due to backscattering or dephasing. Additionally, the CMO-SL provides interface perpendicular magnetic anisotropy (PMA) to the free layer. Including both the SOT line and the CMO-SL under the free layer of the MTJ enables efficient and effective operation of the SOT-MRAM, including fast switching, low switching current/energy, and sufficient data retention in the free layer.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of,"

when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The example embodiments are described in the context of particular magnetic junctions and magnetic memories having certain components. One of ordinary skill in the art will readily recognize that embodiments of the present invention are consistent with the use of magnetic junctions and magnetic memories having other and/or additional components and/or other features not inconsistent with embodiments of the present invention. The method and system are also described in the context of current understanding of spin-orbit interaction, the spin transfer phenomenon, of magnetic anisotropy, and other physical phenomena. Consequently, one of ordinary skill in the art will readily recognize that theoretical explanations of the behavior of the method and system are made based upon this current understanding of spin-orbit interaction, spin transfer, magnetic anisotropy and other physical phenomenon. However, the methods and systems described herein are not dependent upon a particular physical explanation. One of ordinary skill in the art will also readily recognize that the methods and systems are described in the context of a structure having a particular relationship to the substrate. However, one of ordinary skill in the art will readily recognize that the method and system are consistent with other structures. In addition, the method and system are described in the context of certain layers being synthetic and/or simple. However, one of ordinary skill in the art will readily recognize that the layers could have another structure. Furthermore, the method and system are described in the context of magnetic junctions, spin-orbit interaction active layers, and/or other structures having particular layers. However, one of ordinary skill in the art will readily recognize that magnetic junctions, spin-orbit interaction active layers, and/or other structures having additional and/or different layers not inconsistent with the method and system could also be used. Moreover, certain components are described as being magnetic, ferromagnetic, and ferrimagnetic. As used herein, the term magnetic could include ferromagnetic, ferrimagnetic or like structures. Thus, as used herein, the term "magnetic" or "ferromagnetic" includes, but is not limited to ferromagnets and ferrimagnets. The method and system are also described in the context of single magnetic junctions. However, one of ordinary skill in the art will readily recognize that the method and system are consistent with the use of magnetic memories having multiple magnetic junctions. Further, as used herein, "in-plane" is substantially within or parallel to the plane of one or more of the layers of a magnetic junction. Conversely, "perpendicular" corresponds to a direction that is substantially perpendicular to one or more of the layers of the magnetic junction.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

With reference now to FIG. 1, a spin-orbit torque magnetic random-access memory (SOT-MRAM) device 100 according to one embodiment of the present disclosure includes a substrate 101 (e.g., a silicon wafer), a spin orbit torque (SOT) line 102 above the substrate 101, a composite-metal-oxide seed layer (CMO-SL) 103 above the SOT line 102, and a magnetic tunneling junction (MTJ) 104 above the CMO-SL 103. In the illustrated embodiment, the MTJ 104 includes a free layer 105, a main tunneling barrier 106 above the free layer 105, and a synthetic antiferromagnetic pinned layer (SAF-PL) stack 107 above the main tunneling barrier layer 106. In the illustrated embodiment, the SAF-PL stack 107 includes a polarization enhancing layer (PEL) 108 including a texture breaking layer (TBL), a bottom pinned layer 109 above the PEL 108, a spacer layer 110 above the bottom pinned layer 109, and a top pinned layer 111 above the spacer layer 110. The bottom pinned layer 109 has a magnetization that is pinned in a first direction, and the top pinned layer 111 has a magnetization that is pinned in a second direction that is substantially antiparallel to the first direction. The spacer layer 110 provides antiferromagnetic coupling between the top pinned layer 111 and the bottom pinned layer 109. The PEL 108 has a fixed magnetization configuration, and the magnetization direction of the free layer 105 is configured to switch such that the magnetization direction of the free layer 105 may be either aligned or anti-aligned with the magnetization direction of the PEL 108. In this manner, the MTJ 104 is a bi-stable system suitable for memory storage.

In one or more embodiments, the material of the free layer 105 may be selected from iron boron (FeB), FeB—X, iron cobalt boron (FeCoB), FeCoB—X, iron (Fe), Fe—X, iron cobalt (FeCo), or FeCo—X, where X is selected from beryllium (Be), nickel (Ni), molybdenum (Mo), magnesium (Mg), zirconium (Zr), tantalum (Ta), vanadium (V), chromium (Cr), tungsten (W), hafnium (Hf), niobium (Nb), and terbium (Tb). In some embodiments, the free layer 105 may be a composite/stacked layer. For example, in one or more embodiments, the free layer 105 may include iron cobalt boron/iron (FeCoB/Fe).

In one or more embodiments, the main tunneling barrier layer 106 may include magnesium oxide (MgO). Additionally, in one or more embodiments, the PEL 108 may 0 (Co), Iron (Fe), and/or boron (B), the bottom pinned layer 109 may include a ferromagnetic material (e.g., iron (Fe)), and the top pinned layer 111 may include a ferromagnetic material (e.g., iron (Fe)).

The SOT line 102 is configured to generate transverse spin-current that flows to the free layer through the CMO-SL 103. The transverse spin-current flowing from the SOT line 102 to the free layer 105 generates spin orbit torque (SOT) configured to switch magnetization direction of the free layer 105. In one or more embodiments, the SOT line 102 includes tantalum (Ta), tungsten (W), platinum (Pt), hafnium (Hf), or combinations thereof. In one or more embodiments, the SOT line 102 may include an alloy of two or more materials selected from tungsten, platinum, terbium, bismuth, hafnium, zirconium, silver, gold, silicon, copper, chromium, vanadium, and molybdenum. In one embodiment, the SOT line 102 may include an alloy of tungsten and hafnium (WHf).

In one or more embodiments, the SOT line 102 may include a plurality of layers. For instance, the SOT line 102 may include a first layer and a second layer stacked above (e.g., directly on) the first layer. The first and second layer may include different materials selected from tungsten, platinum, terbium, bismuth, hafnium, zirconium, silver, gold, silicon, copper, chromium, vanadium, and molybdenum. For instance, the first layer of the SOT line 102 may include gold (Au) and the second layer of the SOT line 102 may include silicon (Si). The SOT line 102 may also include oxidation at an interface between the first layer and the second layer (e.g., oxidation of an upper surface of a tungsten layer and a silicon layer on the oxidation of the tungsten layer). Providing oxidation at the interface between the first and second layers of the SOT line 102 increases resistivity and the spin Hall angle (SHA).

In one or more embodiments, the SOT line 102 may include a plurality of layers, and each layer may include a same oxide of a material selected from tungsten, platinum, terbium, bismuth, hafnium, zirconium, silver, gold, silicon, copper, chromium, vanadium, and molybdenum. For instance, in one or more embodiments, the SOT line 102 may include a plurality of tungsten (W) layers that were each subject to oxygen treatment (e.g., the SOT line 102 may include W/Ox/W/Ox/W/Ox, where Ox is oxygen treatment).

In one or more embodiments, the SOT line 102 may be a topological insulator, such as bismuth telluride (BiTe), bismuth selenide (BiSe), TlBiTe, TlBiSe, SbTeS, BiTeS, BiTeSe, GeSbTe, SnSbTe, GeBiTe, SnBiTe, bismuth antimonides (BiSb), or BiSbSe. In one or more embodiments, the SOT line 102 may include iridium oxide (IrO$_2$) or SrIrO$_3$.

In one or more embodiments, the SOT line 102 may include a heavy metal based anti-ferromagnet or ferrimagnet. For instance, in one or more embodiments, the SOT line 102 may include A$_x$B$_{1-x}$, where A is iridium (Ir), platinum (Pt), palladium (Pd), or rhodium (Rh), B is manganese (Mn) or iron (Fe), and x is a value between 0 and 1.

The CMO-SL 103 provides transparency to the transverse spin-current generated by the SOT line 102 such that the spin-current is transmitted efficiently to the free layer 105 with minimal loss due to backscattering or dephasing. Additionally, the CMO-SL 103 provides interface perpendicular magnetic anisotropy (PMA) to the free layer 105, which determines the data retention by the free layer 105.

The CMO-SL 103 includes a plurality of layers. In the illustrated embodiment, the CMO-SL 103 includes a first metal-oxide layer (MO1) 112 and a second metal-oxide layer (MO2) 113. The first metal-oxide layer 112 may be an oxide of a metal selected from zirconium (Zr), niobium (Nb), tantalum (Ta), hafnium (Hf), magnesium (Mg), magnesium aluminide (MgAl), and aluminum (Al). In one or more embodiments, the first metal-oxide layer 112 may include a plurality of stacked metal-oxide layers, such as from two (2) to ten (10) stacked metal-oxide layers. In one or more embodiments, the first metal-oxide layer 112 may include one or more stacked metal-oxide layers, such as from one (1) to ten (10) stacked metal-oxide layers, and a metal capping layer above (e.g., on top of) the one or more metal-oxide layers. In one or more embodiments, the first metal-oxide layer 112 may have a thickness in a range from approximately 1 Å to approximately 10 Å.

In one or more embodiments, the second metal-oxide layer 113 of the CMO-SL 103 may be an oxide of a metal selected from nickel (Ni), iron (Fe), cobalt (Co), manganese (Mn), chromium (Cr), and vanadium (V). In one or more embodiments, the second metal-oxide layer 113 may include a plurality of stacked metal-oxide layers, such as from two (2) to ten (10) stacked metal-oxide layers. In one or more embodiments, the second metal-oxide layer 113 may include one or more metal-oxide layers, such as from one (1) to ten (10) stacked metal-oxide layers, and a metal capping layer above (e.g., on top of) the one or more metal-oxide layers. In one or more embodiments, the second metal-oxide layer 113 may have a thickness in a range from approximately 1 Å to approximately 10 Å. In one or more embodiments, the thickness of the second metal-oxide layer 113 may be the same or substantially the same as the thickness of the first metal-oxide layer 112 (e.g., a thickness in a range from approximately 1 Å to approximately 10 Å).

Although in the illustrated embodiment the first metal-oxide layer 112 is stacked above the second metal-oxide layer 113 (e.g., the first metal-oxide layer 112 is directly on an upper surface of the second metal-oxide layer 113), in one or more embodiments, the second metal-oxide layer 113 may be stacked above the first metal-oxide layer 112 (e.g., the second metal-oxide layer 113 may be directly on an upper surface of the first metal-oxide layer 112).

In operation, an in-plane current is supplied to the SOT line 102 to write to the SOT-MRAM device 100. The in-plane current supplied to the SOT line 102 generates a spin orbit torque (SOT) in the free layer 105, which switches a magnetization direction of the free layer 105. The CMO-SL 103 is configured to provide transparency to the transverse spin-current generated by the SOT line 102 such that the spin-current is transmitted efficiently to the free layer 105 with minimal loss due to backscattering or dephasing. Additionally, the CMO-SL 103 provides interface perpendicular magnetic anisotropy (PMA) to the free layer 105 such that free layer 105 exhibits sufficient data retention. Including both the SOT line 102 and the CMO-SL 103 under the free layer 105 of the MTJ 104 enables fast switching, low switching current/energy, and sufficient data retention of the SOT-MRAM device 100.

To read from the SOT-MRAM device 100, a read current passes through the MTJ 104. According, the SOT-MRAM device 100 includes separate (decoupled) read and write paths, which is configured to decrease write times compared to related art spin-transfer-torque magnetic random-access memory (STT-MRAM) devices.

FIG. 2 is a flowchart illustrating tasks of a method 200 of manufacturing a spin-orbit-torque magnetic random-access memory (SOT-MRAM) device according to one embodiment of the present disclosure. In the illustrated embodiment, the method 200 includes a task 210 of forming (e.g., depositing) a spin orbit torque (SOT) line above a substrate. The SOT line formed in task 210 may include any of the materials described above with reference to the SOT line 102 depicted in FIG. 1. For example, in one or more embodiments, the SOT line formed in task 210 may include tantalum (Ta), tungsten (W), platinum (Pt), hafnium (Hf), or combinations thereof; an alloy of two or more materials selected from tungsten, platinum, terbium, bismuth, hafnium, zirconium, silver, gold, silicon, copper, chromium, vanadium, and molybdenum (e.g., an alloy of tungsten and hafnium (WHf)); a stack of first and second layers including different materials selected from tungsten, platinum, terbium, bismuth, hafnium, zirconium, silver, gold, silicon, copper, chromium, vanadium, and molybdenum (e.g., a first layer including gold (Au) and a second layer including silicon (Si)); a topological insulator, such as bismuth telluride (BiTe), bismuth selenide (BiSe), TlBiTe, TlBiSe, SbTeS, BiTeS, BiTeSe, GeSbTe, SnSbTe, GeBiTe, SnBiTe, bismuth antimonides (BiSb), or BiSbSe; iridium oxide ($IrO_2$); $SrIrO_3$; or a heavy metal based anti-ferromagnet or ferrimagnet, such as $A_xB_{1-x}$, where A is iridium (Ir), platinum (Pt), palladium (Pd), or rhodium (Rh), B is manganese (Mn) or iron (Fe), and x is a value between 0 and 1.

Furthermore, in one or more embodiments, the task 210 of forming the SOT line may include a sub-task of oxidizing one or more of the layers. For instance, in one or more embodiments, the task 210 may include a sub-task of performing an oxygen treatment of an upper surface of the first layer to form oxidation at an interface between the first layer and the second layer. In one or more embodiments, the task 210 may include a sub-task of performing an oxygen treatment of each layer deposited to achieve a plurality of layers each including a same oxide of a material selected from tungsten, platinum, terbium, bismuth, hafnium, zirconium, silver, gold, silicon, copper, chromium, vanadium, and molybdenum (e.g., a plurality of tungsten (W) layers that were each subject to oxygen treatment (W/Ox/W/Ox/W/Ox, where Ox is oxygen treatment)).

In the illustrated embodiment, the method 200 also includes a task 220 of forming a composite metal oxide seed layer (CMO-SL) above the SOT line formed in task 210. The task 220 of forming the CMO-SL may include depositing a first metal-oxide layer and a second metal-oxide layer by physical vapor deposition (PVD) (e.g., sputtering, thermal evaporation, or ion plating). In one or more embodiments, task 220 may include forming the first metal-oxide layer and then forming the second metal-oxide layer above the first metal-oxide layer, or forming the second metal-oxide and then forming the first metal-oxide layer above the second metal-oxide layer.

The CMO-SL formed in task 220 may have the same configuration and composition as the CMO-SL 103 described above with reference to the embodiment depicted in FIG. 1. In one or more embodiments, the task 220 of forming the CMO-SL 220 includes a sub-task 221 of forming a first metal-oxide layer and a sub-task 222 of forming a second metal-oxide layer. In one or more embodiments, the sub-task 221 of forming the first metal oxide layer may include a sub-task 221-1 of depositing a metal material, such as zirconium (Zr), niobium (Nb), tantalum (Ta), hafnium (Hf), magnesium (Mg), magnesium aluminide (MgAl), and/or aluminum (Al), and then a sub-task 221-2 of performing an oxygen treatment of the deposited metal material. In one or more embodiments, the sub-task 221 of forming the first metal oxide layer may include repeatedly performing (a number (N) of times, such as from two (2) to ten (10) times) the sub-task 221-1 of depositing the metal material (e.g., Zr, Nb, Ta, Hf, Mg, or MgAl) and the sub-task 221-2 of performing an oxygen treatment on the deposited metal to achieve a plurality of stacked metal-oxide layers, such as from two (2) to ten (10) stacked metal-oxide layers. Additionally, in one or more embodiments, the sub-task 221 of forming the first metal-oxide layer may include a sub-task 221-3 of depositing a metal capping layer above (e.g., on top of) the one or more metal-oxide layers formed in sub-task 221. In one or more embodiments, the first metal-oxide layer formed in sub-task 221 may have a thickness in a range from approximately 1 Å to approximately 10 Å.

In one or more embodiments, the sub-task 222 of forming the second metal oxide layer may include a sub-task 222-1 of depositing a metal material, such as nickel (Ni), iron (Fe), cobalt (Co), manganese (Mn), chromium (Cr), and/or vanadium (V), and then a sub-task 222-2 of performing an oxygen treatment of the deposited metal material. In one or more embodiments, the sub-task 222 of forming the second metal oxide layer may include repeatedly performing (a number (N) of times, such as from two (2) to ten (10) times) the sub-task 222-1 of depositing the metal material (e.g., Ni, Fe, Co, Mn, Cr, and/or V) and the sub-task 222-2 of performing an oxygen treatment on the deposited metal material to achieve a plurality of stacked metal-oxide layers, such as from two (2) to ten (10) stacked metal-oxide layers. Additionally, in one or more embodiments, the sub-task 222 of forming the second metal-oxide layer may include a sub-task 222-3 of depositing a metal capping layer above (e.g., on top of) the one or more metal-oxide layers formed in sub-task 222. In one or more embodiments, the thickness of the second metal-oxide layer formed in sub-task 222 may be the same or substantially the same as the thickness of the first metal-oxide layer (e.g., a thickness in a range from approximately 1 Å to approximately 10 Å) formed in sub-task 221.

In the illustrated embodiment, the method 200 also includes a task 230 of forming a magnetic tunnel junction (MTJ) above the CMO-SL formed in task 220 to complete the SOT-MRAM device. The task 230 of forming the MTJ may include a sub-task 231 of forming a free layer above the CMO-SL, a sub-task 232 of forming a main tunneling barrier on the free layer, and a sub-task 233 forming a synthetic antiferromagnetic pinned layer (SAF-PL) stack above the main tunneling barrier. The configuration and composition of the free layer, the main tunneling barrier layer, and the SAF-PL stack formed in task 230 may be the same as the free layer 105, the main tunneling barrier layer 106, and the SAF-PL stack 107, respectively, described above with reference to the embodiment depicted in FIG. 1.

As described above, the CMO-SL is configured to provide transparency to the transverse spin-current generated by the SOT line such that the spin-current is transmitted efficiently to the free layer with minimal loss due to backscattering or dephasing, and the CMO-SL provides interface perpendicular magnetic anisotropy (PMA) to the free layer such that free layer exhibits sufficient data retention. In this manner, including both the SOT line and the CMO-SL under the free layer of the MTJ enables fast switching, low switching current/energy, and sufficient data retention of the SOT-MRAM device formed according to method 200.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims.

What is claimed is:

1. A spin-orbit torque magnetic random-access memory (SOT-MRAM) device comprising:
   a substrate;
   a spin orbit torque line above the substrate;
   a composite metal-oxide seed layer above the spin orbit torque line; and
   a magnetic tunnel junction above the composite metal-oxide seed layer, the magnetic tunnel junction comprising:
      a free layer above the composite metal-oxide seed layer;
      a main tunneling barrier layer above the free layer; and
      a pinned layer above the main tunneling barrier layer,
   wherein the composite metal-oxide seed layer comprises a first metal oxide layer and a second metal oxide layer, and
   wherein at least one of the first metal oxide layer or the second metal oxide layer comprises a number of metal oxidation layers.

2. The SOT-MRAM device of claim 1, wherein the first metal oxide layer comprises a metal selected from the group consisting of zirconium (Zr), niobium (Nb), tantalum (Ta), hafnium (Hf), magnesium (Mg), magnesium aluminide (MgAl), and aluminum (Al).

3. The SOT-MRAM device of claim 2, wherein the second metal oxide layer comprises a metal selected from the group consisting of nickel (Ni), iron (Fe), cobalt (Co), manganese (Mn), chromium (Cr), and vanadium (V).

4. The SOT-MRAM device of claim 1, wherein the number is in a range from 2 to 10.

5. The SOT-MRAM device of claim 1, wherein the first metal oxide layer and the second metal oxide layer each have a thickness in a range from approximately 1 Å to approximately 10 Å.

6. The SOT-MRAM device of claim 5, wherein the first metal oxide layer and the second metal oxide layer have a same thickness.

7. The SOT-MRAM device of claim 1, wherein the first metal oxide layer is above the second metal oxide layer.

8. The SOT-MRAM device of claim 1, wherein the second metal oxide layer is above the first metal oxide layer.

9. The SOT-MRAM device of claim 1, further comprising a metal capping layer above the first metal oxide layer and the second metal oxide layer.

10. A spin-orbit torque magnetic random-access memory (SOT-MRAM) device comprising:
    a substrate;
    a spin orbit torque line above the substrate;
    a composite metal-oxide seed layer above the spin orbit torque line; and
    a magnetic tunnel junction above the composite metal-oxide seed layer, the magnetic tunnel junction comprising:
       a free layer above the composite metal-oxide seed layer;
       a main tunneling barrier layer above the free layer; and
       a pinned layer above the main tunneling barrier layer, wherein the pinned layer is a synthetic antiferromagnetic pinned layer comprising:
          a polarization enhancing layer (PEL) including a texture breaking layer (TBL);
          a bottom pinned layer above the PEL;
          a spacer layer above the bottom pinned layer; and
          a top pinned layer above the spacer layer.

11. A method of manufacturing a spin-orbit torque magnetic random-access memory (SOT-MRAM) device, the method comprising:
    forming a spin orbit torque line above a substrate;
    forming a composite metal-oxide seed layer above the spin orbit torque line, the forming the composite metal-oxide seed layer comprising:
       depositing a first metal layer;
       performing an oxygen treatment of the first metal layer to form a first metal oxide layer;
       depositing a second metal layer; and
       performing an oxygen treatment of the second metal layer to form a second metal oxide layer; and
    forming a magnetic tunnel junction above the composite metal-oxide seed layer, the magnetic tunnel junction comprising:
       a free layer above the composite metal-oxide seed layer;
       a main tunneling barrier layer above the free layer; and
       a pinned layer above the main tunneling barrier layer,
    wherein the composite metal-oxide seed layer comprises a first metal oxide layer and a second metal oxide layer, and
    wherein at least one of the first metal oxide layer or the second metal oxide layer comprises a number of metal oxidation layers.

12. The method of claim 11, wherein the first metal oxide layer comprises a metal selected from the group consisting of zirconium (Zr), niobium (Nb), tantalum (Ta), hafnium (Hf), magnesium (Mg), magnesium aluminide (MgAl), and aluminum (Al).

13. The method of claim 11, wherein the second metal oxide layer comprises a metal selected from the group consisting of nickel (Ni), iron (Fe), cobalt (Co), manganese (Mn), chromium (Cr), and vanadium (V).

14. The method of claim 11, the forming the composite metal-oxide seed layer further comprises repeatedly depositing the first metal layer and repeatedly performing the oxygen treatment of the first metal layer.

15. The method of claim 11, the forming the composite metal-oxide seed layer further comprises repeatedly depositing the second metal layer and repeatedly performing the oxygen treatment of the second metal layer.

16. The method of claim 11, wherein the first metal layer and the second metal layer each have a thickness in a range from approximately 1 Å to approximately 10 Å.

17. The method of claim 11, wherein the depositing the first metal layer comprises depositing the first metal layer above the second metal layer.

18. The method of claim 11, wherein the depositing the second metal layer comprises depositing the second metal layer above the first metal layer.

* * * * *